United States Patent
Tschuemperlin

(10) Patent No.: US 8,006,822 B2
(45) Date of Patent: Aug. 30, 2011

(54) CONVEYING INSTALLATION AND METHOD OF PLACING A CONVEYING INSTALLATION IN OPERATION

(75) Inventor: Erich Tschuemperlin, Kriens (CH)

(73) Assignee: Inventio AG, Hergiswil (CH)

( * ) Notice: Subject to any disclaimer, the term of this patent is extended or adjusted under 35 U.S.C. 154(b) by 367 days.

(21) Appl. No.: 11/635,257

(22) Filed: Dec. 7, 2006

(65) Prior Publication Data

US 2007/0080026 A1 Apr. 12, 2007

(30) Foreign Application Priority Data

Dec. 7, 2005 (EP) .................................... 05111789

(51) Int. Cl.
*B65G 43/00* (2006.01)
(52) U.S. Cl. ...................................... 198/322; 187/247
(58) Field of Classification Search .................. 198/322, 198/502.1, 571, 575; 187/247, 391; 700/213, 700/230
See application file for complete search history.

(56) References Cited

U.S. PATENT DOCUMENTS

| | | | | | |
|---|---|---|---|---|---|
| 4,246,983 | A | * | 1/1981 | Bril | 187/247 |
| 4,408,291 | A | * | 10/1983 | Gunzberg et al. | 700/115 |
| 4,509,143 | A | * | 4/1985 | Tajima et al. | 187/276 |
| 4,700,810 | A | * | 10/1987 | Otala | 187/247 |
| 4,965,880 | A | * | 10/1990 | Petitjean | 700/112 |
| 5,014,193 | A | * | 5/1991 | Garner et al. | 710/10 |
| 5,257,176 | A | * | 10/1993 | Uetani | 700/83 |
| 5,410,717 | A | * | 4/1995 | Floro | 710/104 |
| 5,579,509 | A | * | 11/1996 | Furtney et al. | 703/27 |
| 5,616,894 | A | * | 4/1997 | Nieminen et al. | 187/247 |
| 5,668,992 | A | * | 9/1997 | Hammer et al. | 713/1 |
| 5,697,485 | A | * | 12/1997 | Abraham et al. | 198/322 |
| 5,826,090 | A | * | 10/1998 | Mealey et al. | 717/162 |
| 5,969,305 | A | * | 10/1999 | Gielis et al. | 187/391 |
| 6,269,911 | B1 | | 8/2001 | Richter | |
| 6,668,211 | B1 | * | 12/2003 | Fujita et al. | 700/245 |
| 6,754,723 | B2 | * | 6/2004 | Kato | 710/8 |
| 6,772,862 | B2 | * | 8/2004 | Friedli | 187/247 |
| 6,869,014 | B2 | * | 3/2005 | Gerstenkorn | 235/385 |
| 6,909,942 | B2 | * | 6/2005 | Andarawis et al. | 700/286 |
| 7,172,055 | B2 | * | 2/2007 | Engel et al. | 187/391 |
| 7,314,117 | B2 | * | 1/2008 | Finschi | 187/247 |
| 7,344,004 | B2 | * | 3/2008 | Engel et al. | 187/391 |
| 7,416,058 | B2 | * | 8/2008 | Marterer | 187/391 |
| 2003/0234950 | A1 | * | 12/2003 | Lay | 358/1.14 |
| 2004/0178021 | A1 | * | 9/2004 | Finschi | 187/247 |
| 2004/0193518 | A1 | | 9/2004 | DePlazes | |
| 2005/0061586 | A1 | * | 3/2005 | Engel et al. | 187/391 |
| 2005/0155821 | A1 | * | 7/2005 | Marterer | 187/247 |
| 2008/0147234 | A1 | * | 6/2008 | Biegelsen et al. | 700/224 |

* cited by examiner

*Primary Examiner* — Gene Crawford
*Assistant Examiner* — William R Harp
(74) *Attorney, Agent, or Firm* — Wolff & Samson PC

(57) ABSTRACT

A method for placing a conveying installation in operation, the conveying installation including several components, wherein at least one conveying mechanism, an installation control and a drive are included. A control program suitable for different installation controls contains different control functions. The control program is executed in the installation control for operation of the conveying installation. The method including the steps of: activating the conveying installation; recognizing identification numbers of components of the conveying installation; checking whether the recognized identification numbers belong to permitted component combinations; recognizing the installation control type; activating the different control functions in the control program in dependence on the recognized installation control type; and releasing the conveying installation for operation.

13 Claims, 4 Drawing Sheets

| Control type | Components for recognition of control type |
|---|---|
| MX-GC | Motherboard1 |
| MX-GC2 | Motherboard2 |
| TX-GC | Motherboard3 and BrakeControl1 and SafetyControl1 |
| TXR5_pre2000_2Line | Motherboard3 and Brake/SafetyControl1 |
| TXR5_2000_2Line | Motherboard3 and Brake/SafetyControl2 |
| TXR5_2000_4Line | Motherboard4 and Brake/SafetyControl2 |
| HX_Pre2000_EECO | Motherboard5 |
| HX_2000_EECO | Motherboard6 |
| HX_Pre2000_DA | Motherboard7 |
| HX_2000_DA | Motherboard8 |
| TX-GC2_NA | Motherboard4 and BrakeControl2 and SafetyControl2 and SafetySupply1 |
| TX-GC2_EUAP | Motherboard4 and BrakeControl2 and SafetyControl3 and SafetySupply1 |

Fig. 4

CONVEYING INSTALLATION AND METHOD OF PLACING A CONVEYING INSTALLATION IN OPERATION

BACKGROUND OF THE INVENTION

The invention relates to a conveying installation and a method for placing a conveying installation in operation.

Conveying installations consist of a plurality of different components. Numbering amongst these is, in particular, a conveying means, for example an elevator or an escalator. Moreover, a drive for the conveying means and an installation control are provided. Communications and safety components are optionally arranged. A control program is executed in the installation control for control of the conveying installation. The installation control has different functions.

Hitherto, in the case of placing a conveying installation in operation, the control program inclusive of the required drivers and functions was activated by way of parameter settings. These parameter settings are stored in the installation control. Alternatively, these parameter settings are created at the time of configuration at the manufacturer and loaded into the control. It is also possible to input the parameters manually at the installation control in order to thus activate and set the control program for the installation control.

In order to keep the development cost for control programs low, it is conventional to use one control program for one kind of conveying installation. Thus, for example, a common control program is employed for different elevator installation controls. A further common control program is employed for different escalator controls. Elevator installations have to have many different functions. In that case it is not necessary to realize all possible functions in the individual cases of use. However, the control program is also designed for the purpose of being able to control an elevator installation in which all possible functions are realized. As an example of a simple realization of a conveying installation there may be cited a freight elevator moved between only two stories. The control outlay in this case is low. In the case of a passenger elevator in a high-rise building the control outlay is substantially higher. A passenger elevator of that kind has, for example, an elevator call control. In addition, safety circuits are required. Air-conditioning of the elevator cages can optionally be present.

It was thus past practice to use a common control program for a conveying installation regardless of which functions were or were not realized in the conveying installation. Setting of the functions in the control program needed for the individual conveying installation was, as explained above, fixed on the basis of parameters which were either programmed at a manufacturer or had to be manually input when the conveying installation was placed in operation.

Due to the multiplicity of different installation control types with different functions in a conveying installation it is, however, always important to recognize the correct installation control type and activate the correct functions for the respective conveying installation. Installation control types of that kind have different complexity depending on the respective outlay. For example, an installation control for the above-mentioned freight elevator does not have to be in a position of controlling an air-conditioning plant. An installation control for the above-mentioned passenger elevator is, thereagainst, substantially more complex in its functional scope.

The different installation control types can be operated only with the matching control program, wherein the large number of possible functions can lead to erroneous configurations, since there are dependencies between the individual functions in the control program and components of a conveying installation. The presence of numerous functions in the control program and numerous parameters does, however, also require many regulations. These represent sources of error. Thus, a conveying installation in which only a few or no parameters have to be set is a more reliable conveying installation.

SUMMARY OF THE INVENTION

It is accordingly the object of the present invention to provide a method and a device making it possible, in the case of a specific component combination of a conveying installation, to recognize the installation control type and, depending on the installation control type, to activate the correct control functions corresponding with these component combinations. Control functions suitable for non-installed component combinations must remain deactivated.

The invention is based on the recognition that with self-recognition of the components of a conveying installation the error source of manual input is excluded. Thus, a device according to the invention is safer and less susceptible to error. Moreover, an additional risk of a hardware conflict in the case of components not matching one another in the installed component combination is reduced, whereby the safety risk is diminished. Safety risks are not acceptable in, in particular, the realm of conveying installations, to which elevator installations and escalators belong.

The method guarantees that only the control functions of the control program intended for a specific component combination are executed in the elevator control.

Control programs are subject to constant development. Individual functions of conveying installations are developed, whereby it is necessary to adapt the control functions in the control program to the new components and in a given case to also change the drivers for drive control of the new components. In this connection it is enormously important that in the case of an update of a driver in the installation control this driver is loaded into the installation control of the conveying installation and executed by this only when this driver was also intended for the installation control and tested.

According to the invention it is proposed that the components of the conveying installation have identification numbers which are recognized on activation of the conveying installation. By virtue of the recognized identification number it is established whether the recognized identification numbers belong to a permitted component combination. Only if the recognized identification numbers belong to a permitted component combination is there a decision therefrom as to which installation control type is present. If identification numbers are recognized which belong to no permitted component combination, placing of the conveying installation into operation is interrupted. The permitted component combinations are combinations of components for which there is present an installation control type in a position to control these components. Tables can be created to list and illustrate the permitted component combinations for each installation control type.

After it has been recognized which installation control type is present the recognized installation control type is set in the control program. The different control functions in the control program are activated in dependence on the recognized installation control type. Only thereafter does release of the conveying installation take place.

In a special embodiment of the invention it is provided that only the drivers for the control functions which were previously also activated as control functions are loaded into the installation control. This ensures that only the correct drivers are loaded into the installation control.

In a further advantageous embodiment of the method according to the invention it is checked after setting of the installation control type whether the recognized component combination corresponds with the activated control functions. The information with regard to which installation control types the control program with the activated control functions is released is contained in the control program. The conveying installation is released only when the component combinations and the control functions are permissible, i.e. when the component combinations are in a position of executing these control functions. Tables can be created to list and illustrate the permitted control functions for each installation type.

In a further advantageous method of the invention the conveying installation is reactivated after release of the conveying installation. Loading of the updated drivers is ensured by this restarting of the conveying installation.

In an advantageous embodiment of the invention the conveying installation is an elevator installation. In an alternative embodiment of the invention the conveying installation is an escalator.

The invention is also fulfilled by a conveying installation with several components, wherein at least one conveying means, an elevator control and a drive are arranged and the installation control has a predetermined functional scope. For operating the conveying installation, a control program suitable for different installation controls and containing different control functions can be executed in the installation control. The components of the conveying installation have identification numbers and in the case of activation of the conveying installation there is recognition of the identification numbers of the activated components. Present in the control program is a list for checking whether the recognized program numbers belong to a permitted component combination and an installation control type can be set in the control program in dependence on the recognized identification numbers. The control functions contained in the control program are activatable in dependence on the installation control type. A check is provided as to whether the recognized component combination corresponds with the activated control functions and the conveying installation can be released if the combination and the activated control function correspond.

Other features and advantages of the present invention will become apparent from the following description of the invention that refers to the accompanying drawings.

BRIEF DESCRIPTION OF THE DRAWINGS

The invention is explained in more detail in the following by way of examples of embodiment illustrated schematically in the drawings, in which:

FIG. 4 shows a table of the relevant component combinations for recognition of each installation control type.

DETAILED DESCRIPTION OF THE INVENTION

Figure 1:
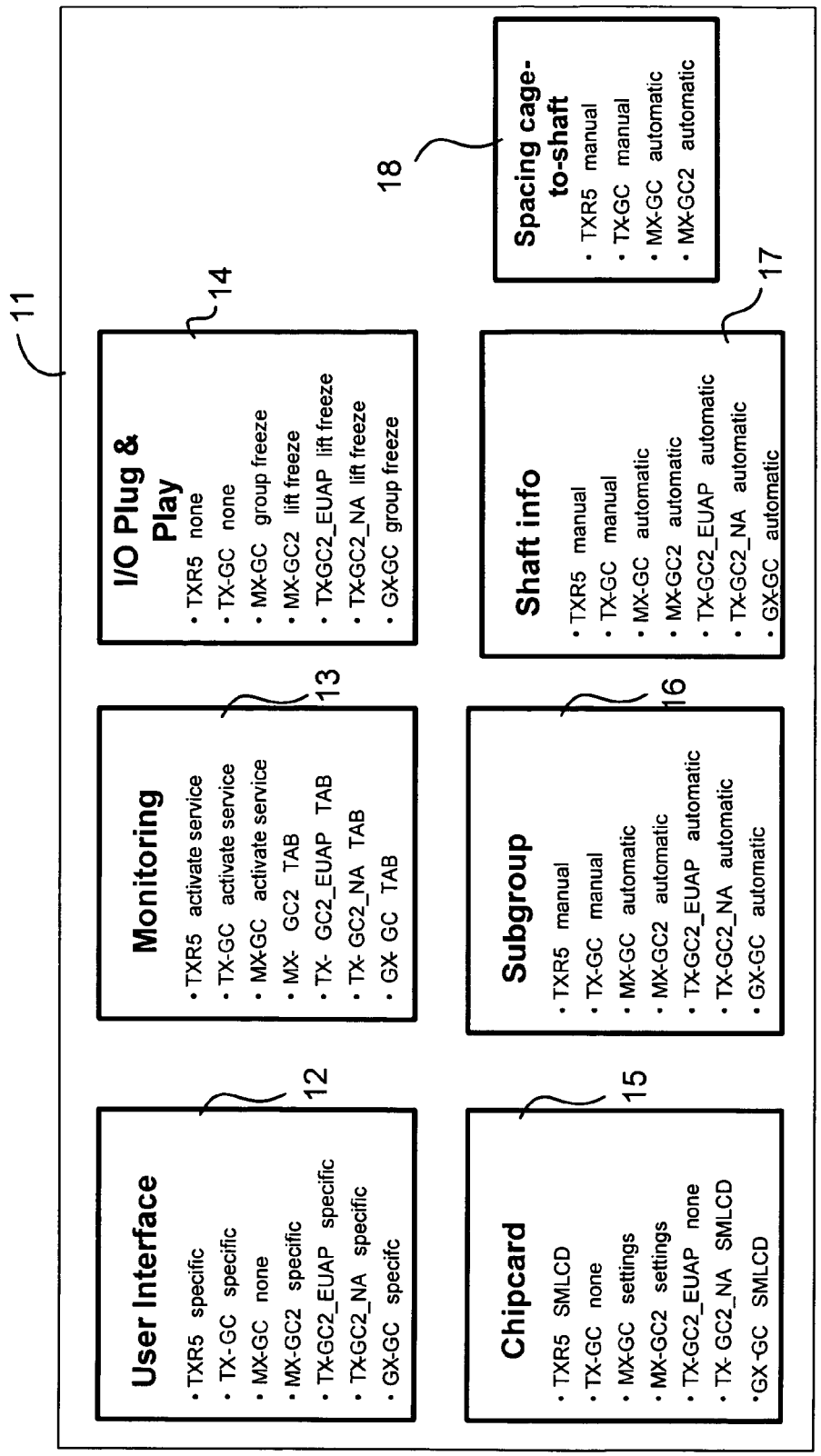
FIG. 1 shows a schematic layout of a control program with different control functions, according to the present invention.

FIG. 1 shows the modular layout of a control program 11 in which different control functions 12 to 18 are implemented.

Each control function 12 to 18 is responsible for a specific function of the conveying installation. The control function 12 is responsible for the drive control of user interfaces in the conveying installation. The control function 13 serves for monitoring and the input and output control of parameters and operating magnitudes at external and internal components. The control function 14 takes over the function I/O Plug & Play, for example the air-conditioning of one or more elevator cages. The control function 15 controls a chipcard reader. The control function 16 takes over a subgroup control for parts of an elevator installation. The control function 17 serves for supply of data picked up by means of, for example, sensors, of an elevator shaft. The control function 18 controls the spacing control between cages and shaft. Another important function is, for example, control of the safety circuit.

Different installation control types are illustrated in the individual modules or control functions 12-18. It can be seen that different settings for the control functions 12-18 are required in the control program 11 for the different installation control types TXR5, TX-GC, MX-GC, MX-GC2, TX GC2_EUAP, TX GC2_NA and GX-GC. Thus, it can be recognized that in, for example, the control function 14, which is responsible for air-conditioning of the conveying installation, no air-conditioning is provided for a control TXR5. In the case of another installation control type, for example MX-GC 2, air-conditioning is provided for each elevator cage. In a further installation control type GX-GC a group air-conditioning of several elevator cages is provided. Similarly, in the case of the control function 15 for the chipcard reader it is recognizable that different chipcard reading apparatus are used for different installation control types. It is thus recognizable in the case of, for example, the control TX-GC that no chipcard reader is required. Settings for the chipcard reader are required for, in particular, the installation control MX-GC. It is readily apparent that due to the multiplicity of different installation control types great care must be taken in the activation of the individual control functions 12-18 or also the control modules in order to avoid safety risks.

Figure 2:
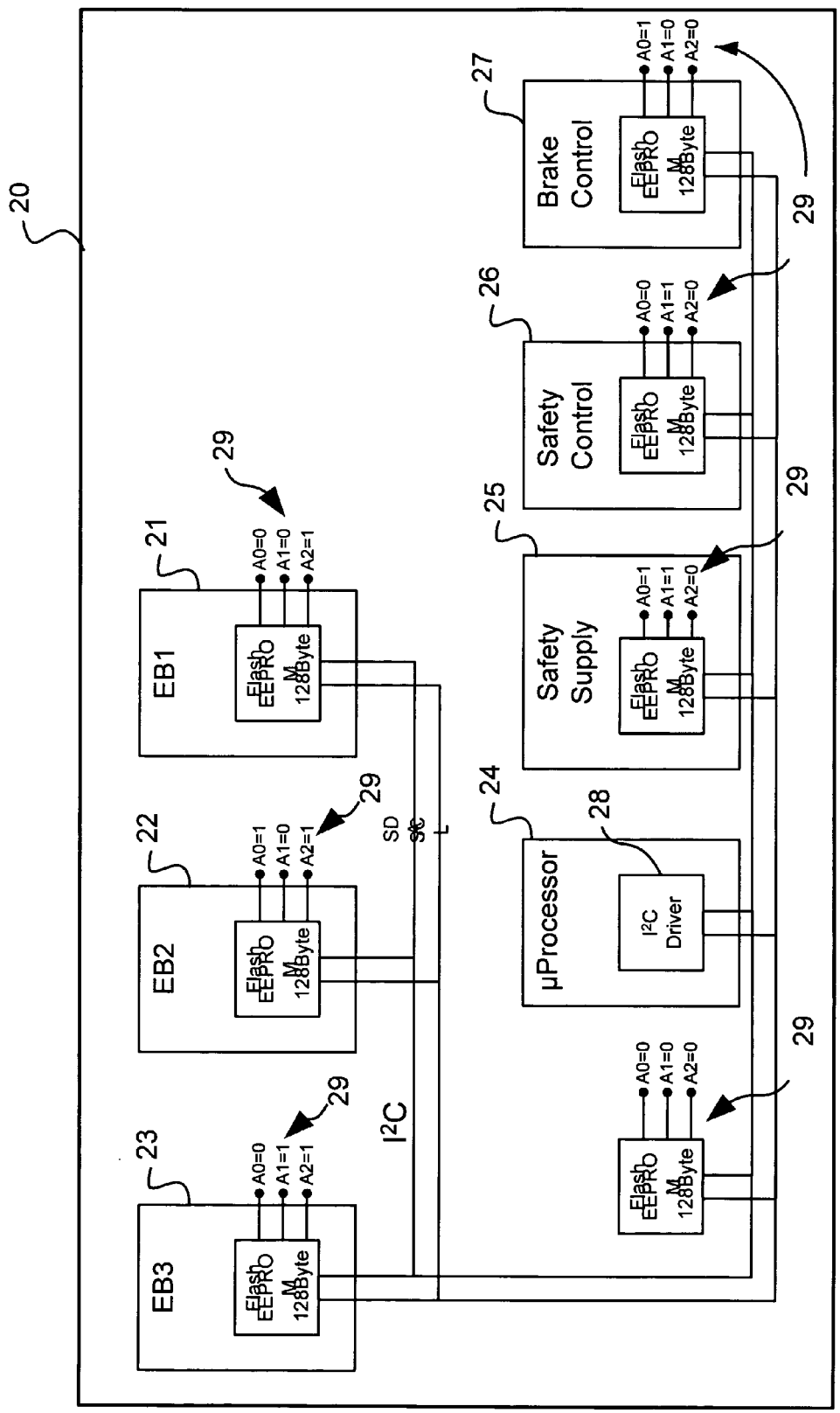
FIG. 2 shows a schematic illustration of the components of an elevator control according to the present invention.

FIG. 2 shows, in a schematic illustration, the different components of an installation control 20. The modules 21-23 are communications modules of the elevator control. The elevator control 20 contains a microprocessor 24 having an I²C functionality 28. Identification numbers 29 at the individual components 21-27, which are stored in EEPROM memory modules of the individual components 21 to 27, are read out at the individual components 21-27 by way of this I²C bus. The identification numbers 29 are characterised by address position A0 to A2. A sufficient number of different identification numbers can be provided by the provision of 3 bits. FIG. 2 shows the layout of a TX-GC installation control.

One component 25 serves for the safety feed or supply. A further component 26 serves for the safety control. In addition, a brake control 27 is provided.

Figure 3:
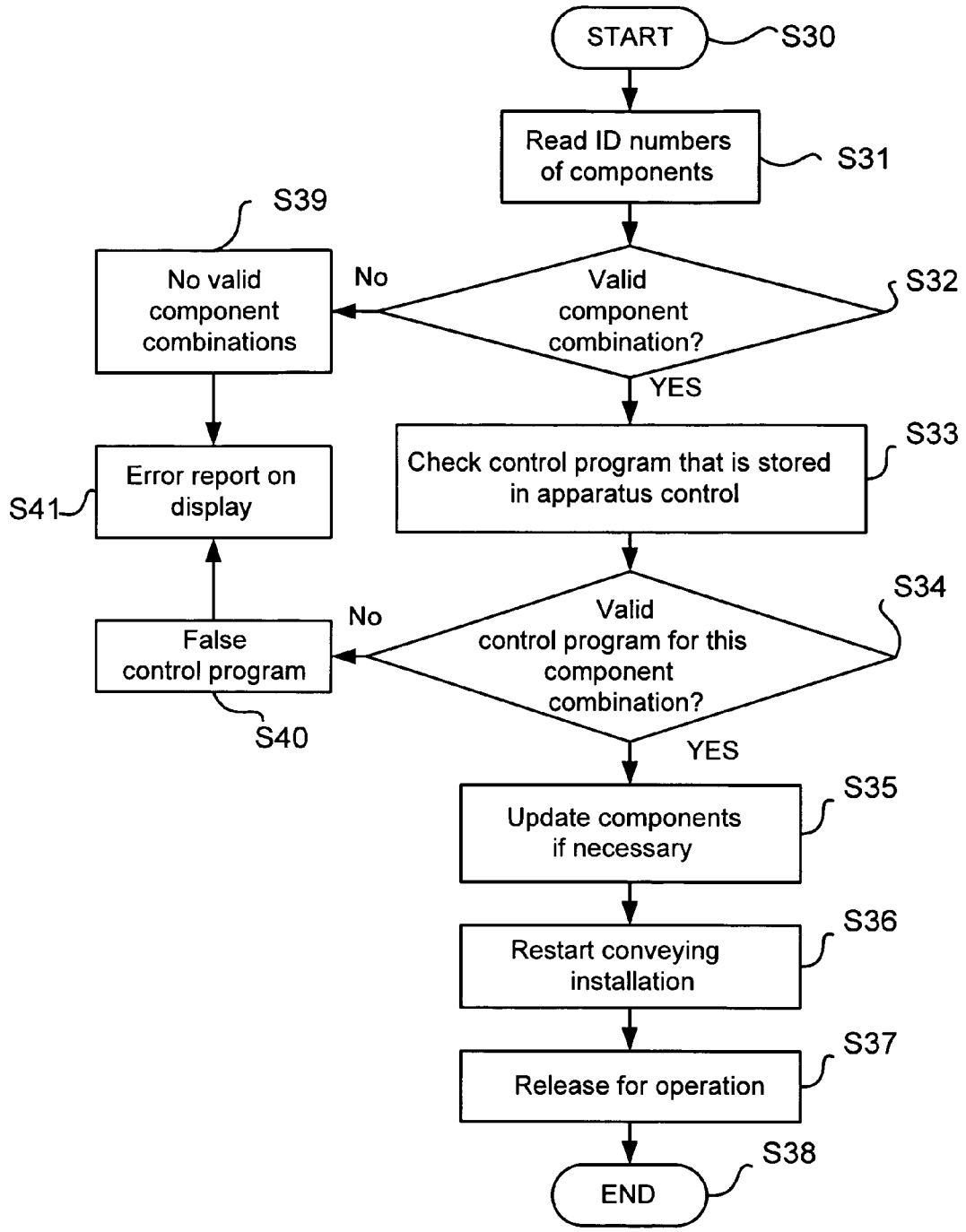
FIG. 3 shows a flow chart for placing a conveying installation in operation.

A flow chart illustrated in FIG. 3 shows the sequence of a method according to the invention. In step S30 the method for placing a conveying installation in operation is started. After the installation was activated, the components of the installation are recognized in step S31 in that the stored identification numbers 29 of the installed components 21-27 are read by the microprocessor 24 by way of the I²C bus. In step 32 it is checked whether the recognized component combination represents a valid component combination.

The permitted or valid component combinations are combinations of components for which there is present an installation control type in a position of controlling these components. A table listing, for each installation control type, the permitted component combinations is stored in the control software. The control software can thus recognize whether the detected component combination is valid and permitted. Such a table is similar to the table illustrated in FIG. 4, which, however, only lists the relevant component combinations for recognition of each installation control type. When the control software detects the component combinations listed in FIG. 4, the control software can assign the combination to a specific installation control type. A specific installation control type can, however, also control many other permitted and valid component combinations, which have not been listed in FIG. 4.

If no valid component combination is illustrated, a communication to the service engineer is issued by way of a display device in step S39, S41. If a valid component combination is present, it is checked in step S33 which control program is stored in the installation control, in a further step S34 it is checked whether this software or the control program for the individually recognized component combination is released. If it is the incorrect control program, a communication is issued by way of a display device in steps S40, S41. If the control program for this component combination is released, the components of the elevator installation are updated in step S35 insofar as this is required. Thereafter, the conveying installation is restarted in step S36 so as to enable correct starting of all control functions, drivers and components. In step 37 the conveying installation is ready for use. The program for placing in operation is concluded by step S38.

Thus, a conveying installation and a method for placing a conveying installation in operation are provided in which it is ensured that only the control program which is also released for the installation control type is executed on the elevator control. Moreover, a common control program for different installation control types can thus be used, wherein then different development versions of the control program are tested and released only for specific installation control types. Thus, for a plurality of different installation control types there exists only a single control program which can be developed centrally, whereby the error search in the control program can be simplified and new control functions can be developed for all installation control types. Through use of version or generation numbers for the control program and the control functions it can be established simply and automatically when placing in operation whether the generation of a control program can be used for an installation control type, since the control program contains information on which installation control types it may be able to be executed.

Activation of control functions in the control program for non-installed components is thus excluded. Moreover, availability of untested or undesired control functions in an impermissible installation control type is prevented, which would otherwise create a safety risk. The method according to the invention ensures that the check which installation control type is incorporated in the conveying installation is determined exclusively on the basis of the installed components. No interaction by a service engineer is required.

Although the present invention has been described in relation to particular embodiments thereof, many other variations and modifications and other uses will become apparent to those skilled in the art. It is preferred, therefore, that the present invention be limited but by the specific disclosure herein, but only by the appended claims.

The invention claimed is:

1. A method of starting a conveying installation which comprises several components including at least one conveying means, an installation control and a drive, wherein a control program suitable for different installation controls contains different control functions, wherein the control program for operating the conveying installation is executed in the installation control, the method comprising the steps of:
    activating the conveying installation;
    determining automatically by the control program identification numbers of components of the conveying installation, each component having a different identification number;
    checking by the control program whether the determined identification numbers belong to a permitted component combination;
    determining the installation control type based on the permitted component combination to which the determined identification numbers belong;
    activating the different control functions in the control program in dependence on the determined installation control type; and
    releasing the conveying installation for operation.

2. The method according to claim 1, further comprising loading at least one driver for the control functions into the installation control in dependence on the activated control functions.

3. The method according to claim 1, further comprising reactivating the conveying installation after an updating of components or control functions.

4. The method according to claim 1, wherein the conveying installation is an elevator installation.

5. The method according to claim 1, wherein the conveying installation is an escalator.

6. The method according to claim 1, wherein the step of determining automatically by the control program identification numbers of components of the conveying installation includes recognizing the components of the conveying installation by reading the identification numbers.

7. A method of starting a conveying installation which comprises several components including at least one conveying means, an installation control and a drive, wherein a control program suitable for different installation controls contains different control functions, wherein the control program for operating the conveying installation is executed in the installation control, the method comprising the steps of:
    activating the conveying installation;
    determining automatically by the control program identification numbers of components of the conveying installation;
    checking by the control program whether the determined identification numbers belong to a permitted component combination;
    determining the installation control type based on the permitted component combination to which the determined identification numbers belong;
    activating the different control functions in the control program in dependence on the determined installation control type;
    releasing the conveying installation for operation; and
    after determination of the installation control type, checking which control program is stored in the installation control and whether the stored control program is valid for the determined component combination,
    wherein the conveying installation is released when component combinations and control functions are permissible.

8. The method according to claim 7, further comprising loading at least one driver for the control functions into the installation control in dependence on the activated control functions.

9. The method according to claim 7, further comprising reactivating the conveying installation after an updating of components or control functions.

10. The method according to claim 7, wherein the conveying installation is an elevator installation.

11. The method according to claim 7, wherein the conveying installation is an escalator.

12. The method according to claim 7, wherein the step of determining automatically by the control program identification numbers of components of the conveying installation includes recognizing the components of the conveying installation by reading the identification numbers.

13. A conveying installation comprising:
  at least one conveying means, and
  an installation control and a drive, the installation control having a predetermined functional scope,
  wherein for operating the conveying installation a control program suitable for different installation controls and containing different control functions is executable in the installation control,
  wherein the components of the conveying installation have identification numbers, each component having a different identification number, and the identification numbers of the activated components is determined by the installation control when the conveying installation is activated, the control program checking whether the determined identification numbers belong to a permitted component combination, and an installation control type being settable in the control program in dependence on the permitted component combination to which the determined identification numbers belong, and the control functions contained in the control program being activatable in dependence on the installation control type, and
  wherein checking is performed by the installation control as to whether the determined component combination corresponds with the activated control functions, and the conveying installation being released when the component combination and the activated control functions correspond.

* * * * *